April 18, 1944.  O. E. DEMPSEY  2,346,666
DIFFERENTIAL VALVE
Filed Aug. 24, 1942
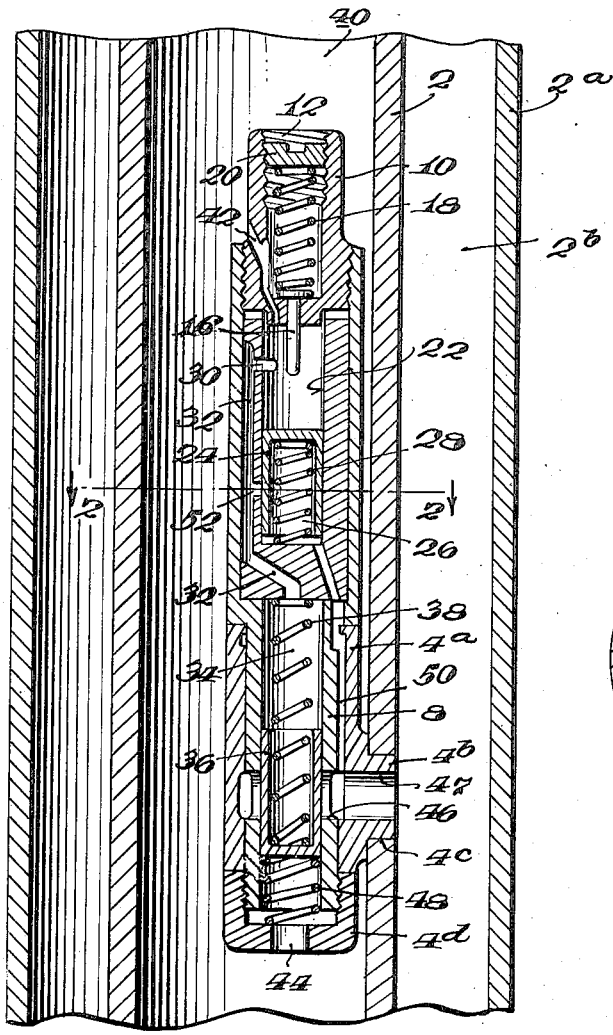
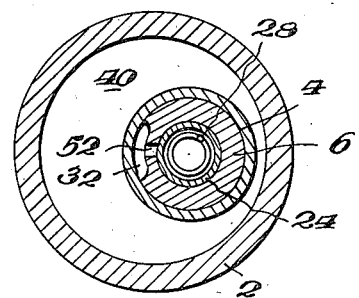
Inventor
Oscar E. Dempsey
By Barry & Cyr
Attorneys Patented Apr. 18, 1944

2,346,666

UNITED STATES PATENT OFFICE 2,346,666

DIFFERENTIAL VALVE

Oscar E. Dempsey, Tulsa, Okla.

Application August 24, 1942, Serial No. 456,105

11 Claims. (Cl. 103—232)

This invention relates to improvements in a well flowing apparatus, and more particularly but not by way of limitation to a differential valve for controlling the admission of gas under pressure into a column of fluid to raise the fluid out of the well.

It is an important object of this invention to provide a differential valve for flowing wells which will control the admission of motive pressure fluid into a column of fluid in such a manner that the valve will open when the hydrostatic head of the column of fluid above the valve reaches a predetermined value which is less than the motive pressure fluid with which it is to be slugged to the top of the well.

And still another object of this invention is to provide a differential valve unit in communication with the hydrostatic head of liquid so as to measure the differential between the hydrostatic head and the motive pressure fluid to provide a positive acting valve in one of two positions.

And still another object of this invention is to provide a differential lifting unit having a plurality of valves constructed so that it will remain in a substantially static position without regard to velocity of the motive pressure fluid until the hydrostatic head of the column of fluid to be lifted reaches a predetermined value to cause positive action of the unit.

Other objects and advantages of the invention will be evident from the following detailed description read in conjunction with the accompanying drawing which illustrates my invention.

A brief description of the drawing is as follows:

Fig. 1 is a vertical sectional view of the differential valve unit shown disposed in a well bore.

Fig. 2 is a view taken on lines 2—2 of Fig. 1.

Referring to the drawing in detail, reference character 2 represents the tubing member of an oil well which is adapted to be disposed in the casing member 2a of the well bore. However, it will be apparent that the disclosure could be construed as a portion of the tubing disposed in a portion of the casing, dependent on whether the valve is arranged in the annulus 2b between the tubing and the casing, or in the tubing itself so as to either displace oil in the annulus or through the eduction tubing.

The lifting unit per se comprises an outer housing 4 containing an upper cylindrical valve housing 6 and having a lower valve housing 8. The upper portion of the housing 4 receives a threaded nut 10 having a threaded recess 12 in communication with an aperture 14 receiving a valve rod 16. A tension spring 18 is anchored between the top of the valve rod 16 and the under face of an adjustable plug 20 for a purpose as will be hereinafter set forth. The valve housing 6 has a bore 22 in which is disposed the cylindrical slide valve 24 providing a chamber 26 in which is anchored a tension spring 28. Housing 6 is provided with a port 30 communicating with a passageway 32 which in turn communicates with a chamber 34 arranged in lower valve housing 8. A lower cylindrical valve 36 is disposed in chamber 34. A helical spring 38 is anchored between the lower face of housing 6 and the upper face of valve 36.

Another housing 4a is provided with a nipple 4b anchored in an opening 4c at one side of the tubing. The housing 4a is of tubular form and surrounds the lower valve housing 8. A nut 4d has a threaded connection with the lower end of the valve housing 8 and holds the parts in assembled relation.

Supply pressure fluid from a source at the top of the well (not shown) and present in the tubing bore 40 discharges through a passageway 42 simultaneous with flow through port 44 to cause downward movement of the valve 24 and bring port 30 and passageway 32 into communication with chamber 34 where it will be apparent that there is an equal pressure on both sides of valve 36 whereby tension spring 38 will maintain it in a lowermost position to close off outlet discharge ports 46 in housing 8 and communicating with outlet passageway 47. A helical spring 48 is disposed beneath the lower face of the valve 36 and merely acts as a shock absorber or bumper spring for the valve. With a sufficient increase in hydrostatic head of liquid to be lifted communicating with passageway 47, and a passageway 50 in turn communicating with chamber 26 beneath valve 24, the valve 24 is moved upward with the assistance of the tension spring 28 to close off the port 30, and open a lower port 52 communicating with passageway 32 and chamber 26. In this manner supply pressure fluid in chamber 34 is bled off through the passageway 32 into chamber 26 thereby unbalancing valve 36 by relieving pressure on one side thereof. With the unbalancing of valve 36 motive pressure fluid flowing through port 44 moves the valve 36 upward to direct motive pressure fluid through outlet port 47 for displacing or slugging well fluid in communication therewith to the top of the well.

The spring 18 can be adjusted by slug 20 to provide a predetermined tension acting against rod 16, which in cooperation with the supply pressure discharging through ports 42 prevents a quick upward movement of valve 24, which in turn would create a quick opening of the lower valve 36. The pressure created by rod 16 resisting upward movement of valve 24 precludes upward movement of valve 24 until sufficient hydrostatic head of liquid to be lifted is present in chamber 26 to cooperate with the spring 28 for opening port 52 to bleed off supply pressure in chamber 34.

From the foregoing it will be apparent that the top valve 24 in communication with the hydrostatic head of liquid can measure the differential between the hydrostatic head and the motive pressure fluid in order to cause actuation of the lower valve either all the way open or all the way closed so as to have a positive acting valve in one of two positions. The valve 24 is so constructed and arranged so as to remain in a substantially static position without regard for the velocity of the supply pressure fluid.

Changes may be made in the combination and arrangement of parts as heretofore set forth in the specification and shown in the drawing, it being understood that any modification in the precise embodiment of the invention may be made within the scope of the following claims without departing from the spirit of the invention.

I claim:

1. In well equipment of the type having concentric tubing and casing members, a differential valve comprising a housing having motive pressure fluid inlets therein communicating with the interior of one of said members, upper and lower valves arranged in the housing, a passageway providing communication between the valves, said upper valve responsive to inlet pressure in the last mentioned member to direct motive fluid through the passageway for balancing the lower valve, a spring for moving said balanced valve to a closed position relative to outlet discharge ports communicating with the interior of the other one of said members, a passageway providing communication between the fluid to be lifted in the last mentioned member and one face of the upper valve whereby an increase in hydrostatic head will move the upper valve to relieve motive fluid against one face of the lower valve and cause upward movement thereof to direct motive fluid through the outlet ports.

2. In well equipment of the type having concentric tubing and casing members, a valve unit comprising a housing having upper and lower valves arranged therein, motive pressure fluid inlet means at opposite ends of the housing communicating with the interior of one of said members, means providing communication between the valves, said upper valve responsive to inlet pressure in the last mentioned member for directing motive fluid through the communicating means for balancing the lower valve, resilient means for moving said balanced valve to a closed position relative to discharge ports communicating with the interior of the other one of said members, a passageway providing communication between the interior of the last mentioned member and the upper valve, and means adapted to raise the upper valve with a sufficient increase in hydrostatic head in the last mentioned member to preclude discharge of motive pressure fluid into the communicating means whereby said lower valve is unbalanced for directing motive fluid through the discharge ports.

3. In well equipment of the type having concentric tubing and casing members, a valve unit comprising a housing having upper and lower valves arranged therein, motive pressure fluid inlet means communicating with the interior of one of said members and with one face of each valve, means providing communication between the valves, said upper valve responsive to inlet pressure in the last mentioned member for directing motive pressure fluid through the communicating means for balancing the lower valve, means for moving said balanced valve to a closed position relative to outlet means communicating with the interior of the other member, means providing communication between the liquid to be lifted in the last mentioned means and one face of the upper valve, and means adapted to raise the upper valve against the motive pressure with a predetermined increase in the hydrostatic head of liquid in the last mentioned member, whereby the lower valve is unbalanced for directing motive fluid through the outlet means.

4. In well equipment of the type having concentric tubing and casing members, a differential valve comprising a housing having upper and lower valves arranged therein, motive pressure fluid inlets communicating with the interior of one of said members and one face of each valve, a passageway providing communication between the valves, said upper valve responsive to inlet pressure in the last mentioned member to direct motive pressure fluid through the passageway for balancing the lower valve, resilient means for moving said balanced valve to a closed position relative to outlet ports communicating with liquid to be lifted in the other one of said members, a passageway providing communication between the fluid to be lifted in the last mentioned member and one face of the upper valve, and resilient means adapted to raise the lower valve against the motive pressure with a sufficient increase in the hydrostatic head of the fluid to be lifted in the last mentioned member, whereby the lower valve is unbalanced for directing motive fluid through the outlet ports.

5. In well equipment of the type having concentric tubing and casing members, a valve unit comprising a housing having upper and lower valves arranged therein, motive pressure fluid inlet means at opposite ends of the housing communicating with the interior of one of said members, means providing communication between the valves, said upper valve responsive to inlet pressure in the last mentioned member for directing motive fluid through the communicating means for balancing the lower valve, resilient means for moving said balanced valve to a closed position relative to discharge ports communicating with fluid to be lifted in the other one of said members, a passageway providing communication between the fluid to be lifted and the upper valve, and means adapted to raise the upper valve with a sufficient increase in hydrostatic head in the last mentioned member to preclude discharge of motive pressure fluid into the communicating means, whereby said lower valve is unbalanced for directing motive fluid through the outlet means, and means to throttle the upward movement of the upper valve.

6. A differential valve unit for use in pumping liquid from wells, comprising a housing containing first and second valve chambers, a valve in the first chamber, a passageway in the housing in communication with the first valve chamber at one side of the valve to permit liquid from a well to enter the first valve chamber and move said valve in one direction, a port for admitting motive fluid into the first valve chamber at the opposite side of the valve, a second passageway placing the first valve chamber at the last mentioned side of the valve in communication with one end portion of the second valve chamber, said valve being adapted to shut off the second passageway when liquid from the well moves the valve to a predetermined position, port means placing an intermediate portion of the second valve chamber in communication with the first passageway, a balanced valve in the second valve chamber normally closing said port means, and an inlet in the opposite end portion of the second valve chamber for admitting pressure fluid for causing unbalancing of the second valve and passage of pressure fluid through said inlet, second valve chamber, port means and out of the first passageway when the first valve is moved to a position where it closes said second passageway.

7. A differential valve unit for use in pumping liquid from wells, comprising a housing containing first and second valve chambers, a valve in the first chamber, a passageway in the housing in communication with the first valve chamber at one side of the valve to permit liquid from a well to enter the first valve chamber and move said valve in one direction, a spring in the first valve chamber to assist in moving the valve in that direction, a port for admitting motive fluid into the first valve chamber at the opposite side of the valve, a second passageway placing the first valve chamber at the last mentioned side of the valve in communication with one end portion of the second valve chamber, said valve being adapted to shut off the second passageway when liquid from the well moves the valve to a predetermined position, port means placing an intermediate portion of the second valve chamber in communication with the first passageway, a balanced valve in the second valve chamber normally closing said port means, and an inlet in the opposite end portion of the second valve chamber for admitting pressure fluid for causing unbalancing of the second valve and passage of pressure fluid through said inlet, second valve chamber, port means and out of the first passageway when the first valve is moved to a position where it closes said second passageway.

8. A differential valve unit for use in pumping liquid from wells, comprising a housing containing first and second valve chambers, a valve in the first chamber, a passageway in the housing in communication with the first valve chamber at one side of the valve to permit liquid from a well to enter the first valve chamber and move said valve in one direction, a port for admitting motive fluid into the first valve chamber at the opposite side of the valve, yielding means in the first valve chamber at the last mentioned side of the valve for resisting movement of the valve in said direction after the valve has travelled a predetermined degree, a second passageway placing the first valve chamber at the last mentioned side of the valve in communication with one end portion of the second valve chamber, said valve being adapted to shut off the second passageway when liquid from the well moves the valve to a predetermined position, port means placing an intermediate portion of the second valve chamber in communication with the first passageway, a balanced valve in the second valve chamber normally closing said port means, and an inlet in the oppositie end portion of the second valve chamber for admitting pressure fluid for causing unbalancing of the second valve and passage of pressure fluid through said inlet, second valve chamber, port means, and out of the first passageway when the first valve is moved to a position where it closes said second passageway.

9. A differential valve unit for use in pumping liquid from wells, comprising a housing containing first and second valve chambers, a valve in the first chamber, a passageway in the housing in communication with the first valve chamber at one side of the valve to permit liquid from a well to enter the first valve chamber and move said valve in one direction, a port for admitting motive fluid into the first valve chamber at the opposite side of the valve, a second passageway placing the first valve chamber at the last mentioned side of the valve in communication with one end portion of the second valve chamber, said valve being adapted to shut off the second passageway when liquid from the well moves the valve to a predetermined position, port means placing an intermediate portion of the second valve chamber in communication with the first passageway, a balanced valve in the second valve chamber normally closing said port means, springs in the second valve chamber at opposite sides of the last mentioned valve for balancing the same, and an inlet in the opposite end portion of the second valve chamber for admitting pressure fluid for causing unbalancing of the second valve and passage of pressure fluid through said inlet, second valve chamber, port means, and out of the first passageway when the first valve is moved to a position where it closes said second passageway.

10. A differential valve unit for use in pumping liquid from wells, comprising a housing containing first and second valve chambers, a valve in the first chamber, a passageway in the housing in communication with the first valve chamber at one side of the valve to permit liquid from a well to enter the first valve chamber and move said valve in one direction, a port for admitting motive fluid into the first valve chamber at the opposite side of the valve, a second passageway placing the first valve chamber at the last mentioned side of the valve in communication with one end portion of the second valve chamber, a port placing the second passageway in communication with the first chamber at the first mentioned side of the valve when the latter has been moved to a predetermined position in said direction, said valve being adapted to shut off the second passageway when liquid from the well moves the valve to a predetermined position, port means placing an intermediate portion of the second valve chamber in communication with the first passageway, a balanced valve in the second valve chamber normally closing said port means, and an inlet in the opposite end portion of the second valve chamber for admitting pressure fluid for causing unbalancing of the second valve and passage of pressure fluid through said inlet, second valve chamber, port means, and out of the first passageway when the first valve is moved to a position where it closes said second passageway.

11. A differential valve unit for use in pumping liquid from wells, comprising a tubular housing containing upper and lower valve chambers, a vertically movable valve in the upper chamber, a passageway in the housing in communication with the upper valve chamber below said valve to permit liquid from a well to enter the upper valve chamber and move said valve upwardly, a port for admitting motive fluid into the upper end portion of the upper valve chamber, a second passageway placing the upper portion of the upper chamber in communication with the upper end portion of the lower valve chamber, said valve being adapted to shut off the second passageway when liquid from the well moves the valve upwardly to a predetermined position, port means placing an intermediate portion of the lower valve chamber in communication with the first passageway, a balanced valve in the lower valve chamber normally closing said port means, and an inlet in the lower end portion of the lower valve chamber for admitting pressure fluid for causing unbalancing of the second valve and passage of pressure fluid through said inlet, lower valve chamber, port means, and out of the first passageway when the vertically movable valve is moved to a position where it closes said second passageway.

OSCAR E. DEMPSEY.